United States Patent

[11] 3,623,022

[72] Inventor Robert C. Day
San Jose, Calif.
[21] Appl. No. 888,482
[22] Filed Dec. 29, 1969
[45] Patented Nov. 23, 1971
[73] Assignee International Business Machines Corporation
Armonk, N.Y.

[54] MULTIPLEXING SYSTEM FOR INTERLEAVING OPERATIONS OF A PROCESSING UNIT
12 Claims, 4 Drawing Figs.

[52] U.S. Cl. .......... 340/172.5
[51] Int. Cl. .......... G06f 9/18
[50] Field of Search .......... 340/172.5

[56] References Cited

UNITED STATES PATENTS

| | | | |
|---|---|---|---|
| 3,210,733 | 10/1967 | Terzian et al. | 340/172.5 |
| 3,377,619 | 4/1968 | Marsh et al. | 340/172.5 |
| 3,302,187 | 1/1967 | Voigt | 340/172.5 |
| 3,303,476 | 2/1967 | Moyer et al. | 340/172.5 |
| 3,440,612 | 4/1969 | Womack | 340/172.5 |

*Primary Examiner*—Raulfe B. Zache
*Attorneys*—Hanifin and Jancin and John H. Holcombe

ABSTRACT: Apparatus for controlling the operation of a plurality of data storage devices and the transfer of data between the devices and one or more data processing systems. The apparatus includes complete primary and partially duplicative secondary circuitry which responds to certain combinations of instructions from separate sources in the same data processing system or from different data processing systems to selectively run a primary operation at full speed or interleave a primary operation and a secondary operation.

INVENTOR.
ROBERT C. DAY

BY John H. Holcombe
ATTORNEY

MULTIPLEXING SYSTEM FOR INTERLEAVING OPERATIONS OF A PROCESSING UNIT

BACKGROUND OF THE INVENTION

1. Field of the Invention

The invention relates to data processing equipment, and more particularly to means for selectively interleaving two operations of a data storage control system.

2. Description of the Prior Art

A control unit for controlling data storage devices operates in response to instructions received from a central processing unit to operate the devices to find desired data or empty space in which to place data. Most such prior control units would merely transfer data directly between the central processing unit and the data storage device. The primary importance of the control unit was to assume most of the work of physically causing data storage devices to store or supply data for the central processing unit and thereby free the central processing unit to do somewhat more processing work.

A major difficulty was that all such data storage devices comprise mechanical devices such as disk files wherein desired data or space is continuously moving and available only at the precise instant when the physical space occupied thereby is in precise juxtaposition with the transducer. Thus, the timing for the moment of data transfer was under the control of the data storage device and not of the central processing unit. As the result, the central processing unit was required to wait until the desired spot on the disk is in precise juxtaposition with the transducer. The central processing unit was therefore tied up for a substantial portion of time merely waiting for the data storage device.

An improvement to control units comprised the addition thereto of a buffer or storage means. This allowed a separation of the transfer of data between the control unit and data storage device and between the control unit and central processing unit. The central processing unit could therefore cause the transfer of data between it and the buffer and the control unit at a time more in accordance with the needs of the central processing unit, and the control unit alone would be involved with the need to wait for the moment of precise alignment of the data storage device for the transfer of the data between the buffer and the device.

Another improvement in capability which has been added to some control units is the ability to conduct a search for desired data. The object of the search operation is to locate a desired data record by utilizing a portion of the data itself, called a "key," such as a person's surname or Social Security Number. With the buffer, the central processing unit transfers data representing the desired key to the control unit, which data is stored in the buffer. With the transducer positioned at the desired track, the control unit operates in accordance with built-in logic circuitry to read the key of each record as it passes the transducer. Each key which is read from a record is immediately compared with the desired key as read from the buffer. When the comparison indicates that the desired data is being read, the remainder of the record is then read into the buffer for subsequent transfer to the central processing unit.

One difficulty, however, is that the control unit is tied up for the entire length of time required for the search.

The present central processing unit is normally able to continue operation while the control unit is conducting the search. This is accomplished by providing the central processing unit with a plurality of different programs, the central processing unit having the capability of switching between these programs. Thus, when a search operation is being conducted with respect to one program, it is capable of putting that program aside and switching to another program. The central processing unit then operates on that other program until it has reached a similar waiting situation. Then the central processing unit can check to see whether the control unit has completed the search on the first program and, if so, switch back to the first program. If both programs are in a waiting situation, the central processing unit may then switch to a third program. Switching from one program to another can, in itself, cause a significant delay. Thus, the greater the number of steps that can be accomplished in the given program before a point is reached where the central processing unit must switch to another program, the less will be the delay resulting in a greater efficiency for the entire data processing system.

During the time that the control unit is conducting a search operation, discussed above, the alternate program of the central processing unit may desire to communicate with the same control unit. Such communication may include such things as reserving one of the data storage devices connected to the control unit for use by that program. In addition, other central processing units may be connected to and utilize the same control unit and the same or different data storage devices connected to that control unit. Hence, while the control unit is conducting a search for one central processing unit, another central processing unit may desire to communicate with the control unit. In both instances, the fact that the control unit is conducting a lengthy search operation prevents communication with the control unit by another program or another central processing unit, other than a signal that the control unit is "busy." The concerned central processing unit must then switch to other programs until a program is found which is at such a stage that the next step may be accomplished by the central processing unit without first communicating with the control unit, thereby substantially impairing the efficiency of the total data processing system.

SUMMARY OF THE INVENTION

An object of the present invention is to provide apparatus allowing a data storage control system to selectively respond to communication from a central processing unit during the conduct of another operation.

Briefly, the invention comprises apparatus including memory means for storing instruction and data signals, primary and secondary instruction and data address registers, and an instruction signal decoder for providing control signals. Addressing means is provided which is responsive to address signals for addressing portions of the memory means. Memory input means is responsive to certain control signals for supplying instruction and data signals to addressed portions of the memory means. Memory output means is responsive to certain control signals for reading control and data signals from addressed portions of the memory means to the decoder. Operation means is responsive to the control signals from the decoder to accordingly operate the apparatus. Logic means responds to certain control signals and signals indicating certain operations by the operation means to supply address signals to the address registers. A clock supplies two trains of alternate sets of clock signals. An interleaving control normally combines both trains of clock signals, supplying the combined train of signals to the primary means, and blocks all clock signals from the secondary means, preventing operation thereof. The interleaving control responds to a coincidence of a primary control signal from the decoder and a secondary request input signal to thereby supply the alternate sets of clock signals, respectively, to the primary means and secondary means, whereby primary and secondary operations of said apparatus occur alternately on an interleaved basis.

DESCRIPTION OF THE PREFERRED EMBODIMENT

Figure 1:
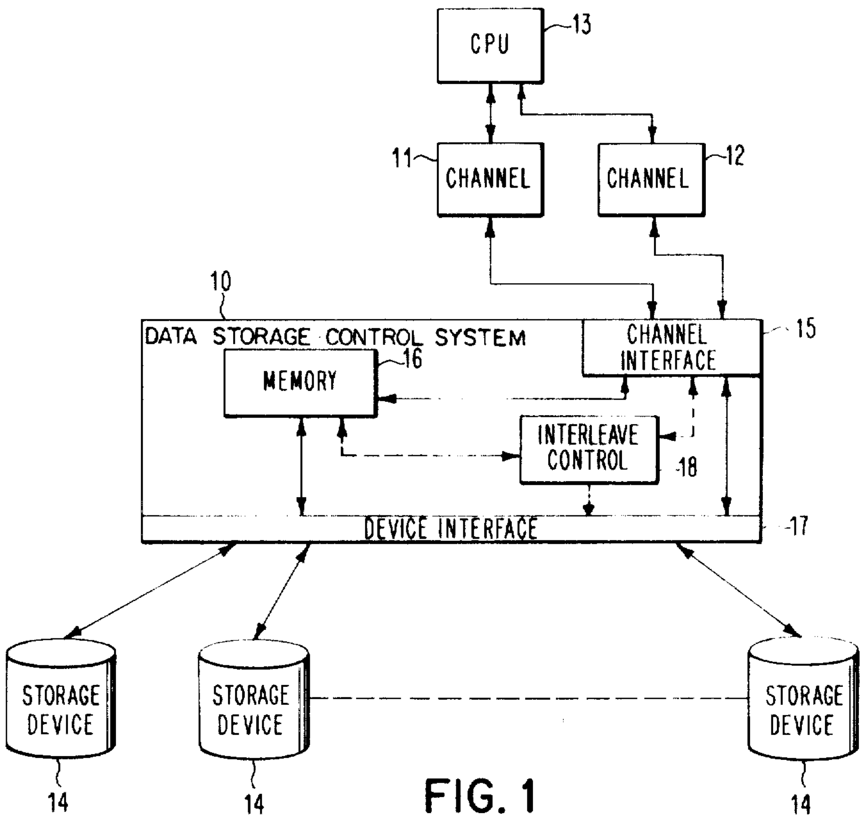
FIG. 1 is a block diagram showing the overall data processing system including the data storage control system of the subject invention.

Referring to FIG. 1, a data storage control system 10 constructed in accordance with the present invention receives instructions from one or more channels 11 and 12 of a central processing unit 13. Also connected to the data storage control system are a plurality of data storage devices 14. The instructions received from channels 11 and 12 may relate to one or more of the data storage devices 14. As discussed above, the data storage control system 10 operates in response to the received instructions to operate the data storage devices 14 to find desired data or empty station in which to place data, and then to accomplish the data transfer.

The major elements of the data storage control system 10 are illustrated as comprising a channel interface 15, a memory 16, a device interface 17 and an interleave control 18. The data storage control system 10, with the exception of the interleave control 18 and certain other circuitry which will be specified hereinafter, is the same as that described in copending patent application, Ser. No. 604,876, filed Dec. 27, 1966, "Method and Apparatus for Multiplex Control of a Plurality of Peripheral Devices for Transfer of Data with a Central Processing System," John J. Harmon, assigned in common with the present case. For a detailed description of the specific portions of the data storage control not essential to the present invention, reference is made to the above-identified, copending case.

The data storage control system 10 is normally arranged to accomplish a plurality of different operations. The central processing unit 13 may communicate with the data storage control system 10 through one of the channels 11 or 12 of the central processing unit whenever the data storage control system is available. The "accept start" function of the data storage control system comprises the acceptance from a channel of the central processing unit of a "start I/O" command together with an address which identifies the control 10 and the storage device 14 desired. The multiplexing control responds to the command by checking a register to determine whether the device has been reserved by another channel or whether there is an uncompleted outstanding instruction from another channel for the device, and thereby either accepts or rejects the command. If accepted, the command is followed by an instruction set and associated data, if any. The instruction set includes codes designating selected ones of various functions which will be explained hereinafter. For example, if a search instruction is provided, the data upon which the search is based must be transmitted therewith. Similarly, if the instruction includes a write instruction, the data to be written must be transmitted therewith.

A function called "accept test" comprises transmission of a "test" command from a channel of the central processing unit together with the address identifying the control system 10 and a particular storage device 14. Upon acceptance of this instruction by the control system, the commands in the control system relating to that device and associated registers are queried to determine in detail the status of the instructions, therefore, the extent these instructions have been executed, and any errors or problems encountered. This data is transmitted by the control system 10 to the channel 11 or 12 providing the command.

The function "present data" is initiated by a "present data" command from a channel of the central processing unit together with a designation of the control system 10 and the particular data storage device 14. In response thereto, the control system queries a particular area of the memory 16 pertinent to the selected device to determine that a read instruction in the instruction set therefor has been executed and that the appropriate data is in the associated portion of storage 16 dedicated to that data. If not, the instruction is refused, and if so, it is accepted. Upon acceptance, the control system transmits the data from the data area of memory 16 to the requesting channel 11 or 12 and then effects the erasure of the instruction in data in the memory 16.

Assuming that an "accept start" command has been accepted by the control system, the instruction set submitted by the channel would normally include a "seek" instruction. The control system responds by operating an "initiate seek" function. This function comprises an insertion of the address of the desired "cylinder" into the cylinder address register of the selected device by the control. The selected data storage device will then operate in accordance with the cylinder address by positioning a movable set of transducers to the selected cylinder. "Cylinder" comprises the normal name for a set of tracks which are simultaneously aligned with a corresponding set of transducers in the selected device and which may be accessed merely by electronically switching to the desired transducer.

When a seek has been completed (meaning that the heads have been positioned at the desired cylinder and the desired transducer is switched on), the data storage device informs the control system 10 thereof by transmitting the address of the track. Whenever so notified, the control system automatically sets a bit in a register corresponding to that device. This operation is called "queue seek complete."

Upon the data storage control system 10 becoming available to proceed with operation of the device, the "test for seek complete" function occurs. This comprises merely testing the registers to determine if any has been set. The registers are tested in a predetermined order until one indicates a seek complete. At this time, the next instruction in the instruction set relating to that data storage device is executed.

That next function is normally the "search by reading" function. It comprises reading a selected portion of information, called a "key," recorded on a selected track and transmitting this data to the control system 10 which compares the key with an argument provided with the instruction set for that device. The typical system may be programmed to provide a positive comparison ("hit") if the data read is identical to the argument ("equal") or if it differs from the argument in some predetermined manner (higher, higher or equal, lower, or lower or equal).

If the comparison circuitry indicates a hit, the control system refers to the instruction set for the device just searched for the next instruction. This instruction will normally comprise either a read instruction or a write instruction. If the instruction is to read, the control system causes the data on the same track and immediately following that which was searched to then be read from the storage device and stored in the memory 16. If the instruction is to write, the control system reads the data from the data area of memory 16 to that device which records the data immediately following that which was searched.

If the search indicates no hit, the control system awaits the next "key" block of data to be searched. The search thus continues until a hit is made or all of the keys on a track have been searched.

Another function of the control system is the "request interrupt" function. This function occurs upon completion of a set of instructions as received from a channel 11 or 12 or upon the inability to continue with a set of instructions due to a problem. The storage control 10 accomplishes the "request interrupt" function by presenting a predetermined voltage on a wire leading from the control to a selected channel. This means that the storage control is available to communicate with the selected channel.

The central processing unit may accept the request interrupt and indicate that it is available to accept status data from the storage control. If so, circuitry within the control will perform the function of "present status." This comprises transmitting the address of the storage control 10 and the pertinent data storage device 14 attached thereto, the status of which is to be presented, and data representing the status. This status comprises a single bit which is either on or off. The "on" bit means that "your requested job is complete" and the "off" bit means "your requested job is not complete due to a problem."

Figure 2:
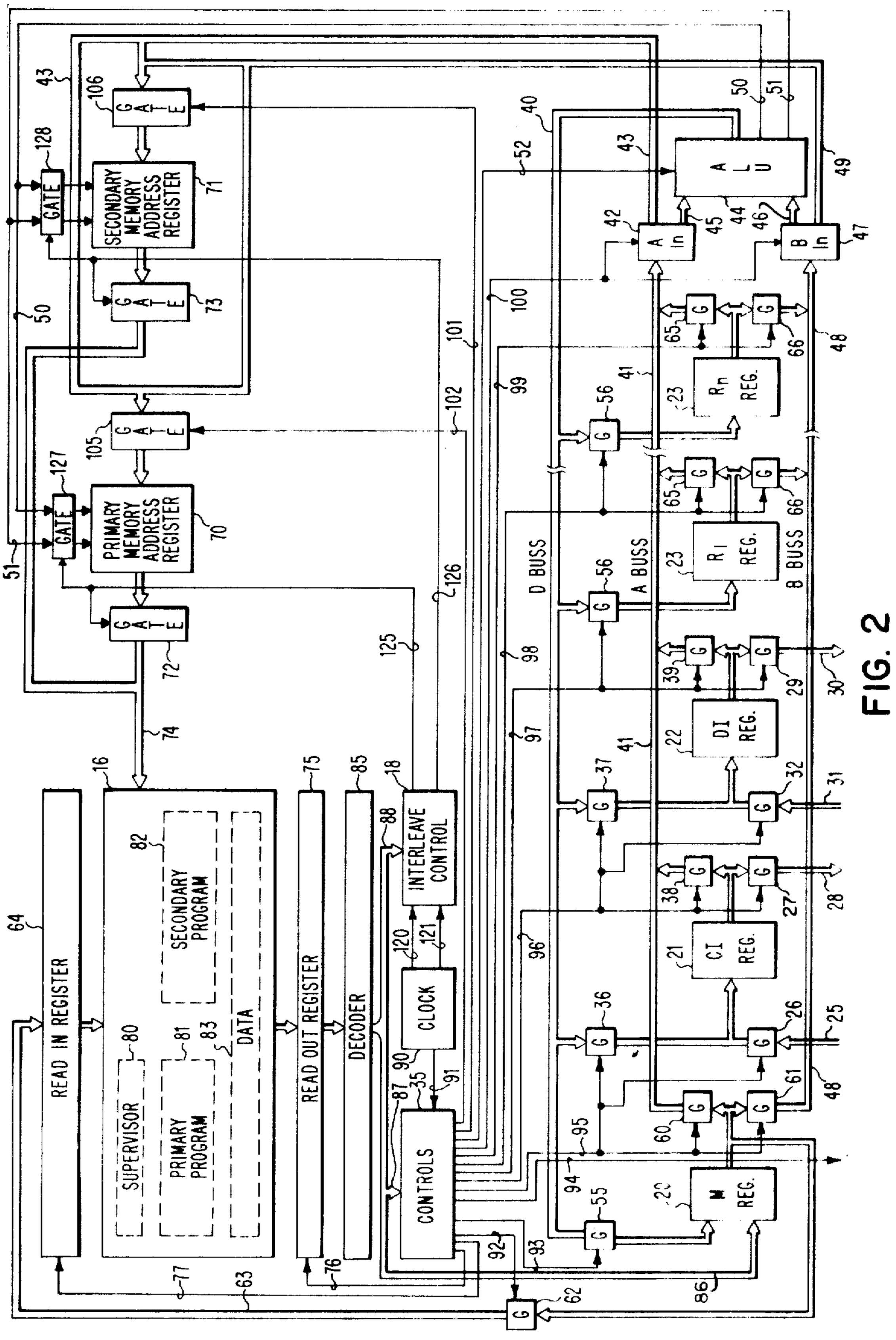
FIG. 2 is a diagrammatic representation of the data storage control system of the subject invention.

Referring now to FIG. 2, the data storage control system 10 is illustrated in greater detail. Memory 16 is illustrated, as well as interleave control 18. All data or instructions to be read into or out of memory 16 are directed through register 20.

Register 21 comprises the means for use with channel interface 15 for communicating with channels 11 or 12. Register 21 is operated only under the control of the secondary program. Register 22 comprises the means for use with device interface 17 for communicating with data storage devices 14. Communication can occur with only one device at a time. Register 22 is operated only under the control of the primary program. The data storage device is thus indicated as being of superceding importance. The reason for this has been explained above in that data storage devices comprise mechanical devices such as disk files with a continuously moving storage medium and the desired data is available only when it is in precise juxtaposition with the transducer. Thus, interaction with the device must have priority over interaction with the channel.

A series of identical registers 23, "R1–N," comprise general purpose registers which hold selected data for subsequent use by the storage control. These registers may be employed by either the primary or secondary programs.

Instructions and data from channels of the CPU are supplied through the channel interface on wires making up cable 25 to gate circuit 26. Any data or other information to be transmitted from the storage control to channels of the central processing unit are supplied through gate circuit 27 on wires making up cable 28. Commands and data from the storage control to the device interface are supplied through gate circuit 29 on wires making up cable 30. Data or signals from the device through the device interface are supplied on wires making up cable 31 to gate circuit 23.

Gates 26, 27, 29 and 32 are all connected to registers 21, 22, gate 26 controlling the transfer of information from a channel to register 21, gate 32 controlling the transfer of information from a device to register 22, gate 27 controlling the transfer of information from register 21 to a channel, and gate 29 controlling the transfer of information from register 22 to a device. These gates are individually operated by signals from controls 35, as will be explained hereinafter.

Registers 21 and 22 are also connected by means of gates 36–39 to D bus 40 and A bus 41. Gate 36 controls the transfer of information from D bus 40 to register 21, gate circuit 37 controls the transfer of information from the D bus 40 to register 22, gate circuit 38 controls the transfer of information from register 21 to A bus 41, and gate circuit 39 controls the transfer of information from register 22 to the A bus 41. A bus 41 comprises a set of parallel wires connected to gate circuit 42. The gate circuit 42 comprises two sets of gates, one of which controls the transfer of information from A bus 41 to cable 43, and the other set of gates controls the transfer of information from A bus 41 to an arithmetic logic unit 44, via cable 45. A second input to arithmetic logic unit 44 comprises a cable 46 from gating circuits 47. The gating circuits 47 operate similarly to circuits 42 to control the transfer of information from parallel set of wires called B bus 48 selectively to cable 46 or to a cable 49. The output of the arithmetic logic unit 44 comprises D bus 40.

The arithmetic logic unit 44 comprises a set of logic and gating circuits which are operated under the control of signals appearing from a set of wires 52 from controls 35 to perform various functions. The functions which are important here are those of transmitting data from cable 45 or from cable 46 directly onto D bus 40, and of comparing data appearing on cable 45 with that appearing on cable 46 to indicate whether or not the data is equal. The result of the comparison is supplied on wires 50 and 51 to designate whether the comparison was equal, high or low. These outputs are employed to directly modify address bits for the address of the next instruction, as will be explained hereinafter.

Data appearing on D bus 40 may be supplied by gate 55 to register 20, by gates 36 and 37 to registers 21 or 22, or by any one of a plurality of gates 56 to corresponding registers 23. Each of the registers 20–23 is capable of storing bits of data presented in parallel thereto, holding that information, unchanged, in the register until new data is entered, and the data contained therein may be gated out at any time. The output of register 20 is controlled by gates 60, 61 and 62 to, respectively, A bus 41, B bus 48 or cable 63 to read in register 64. The outputs of registers 23 to A bus 41 are controlled by gates 65 and the outputs therefrom to B bus 48 are controlled by gate 66.

The memory 16 is arranged to be twice the size of the corresponding memory of the above-identified copending patent application. The memory thus serves both as a data buffer and as a control store. Unlike the read only control store of that application, the control instructions contained in memory 16 may be changed. However, these changes are made only on abnormal and rare occasions.

The normal operation of memory 16 in providing instructions is the same as a read only store. Address signals from either primary memory address register 70 or secondary memory address register 71, as gated to the memory by gate circuit 72 or gate circuit 73, respectively, to cable 74 causes addressed information to be gated out in parallel to read out register 75. Readout register 75 accepts and registers the information due to the appearance of an enabling signal on line 76 from control circuitry 35. The absence of an enabling signal on line 77 prevents any data in read-in register 64 from being transmitted to the memory, thus causing a direct resetting of that portion of the memory to the data which has been read out. Apparatus for accomplishing such resetting is well known and a normal part of such memories.

For convenience in illustration, the various instructions contained in the memory are shown in the physical groupings of supervisor 80, primary program 81 and secondary program 82. The supervisor comprises merely a few limited steps for initially communicating with a channel of a central processing unit in response to a "start I/O," "test," "present data," or "present status" input.

The primary and secondary programs have been briefly discussed and will be described in more detail hereinafter.

Instructions from a CPU for the data storage devices and any associated data are stored in area 83 of the memory 16. Area 83 is divided into subareas, one for each attached data storage device.

The primary and secondary memory address registers 70, 71 each store addresses for two separate groups of information. The addresses are supplied on cable 74 to memory 16, where two separate groups of information are addressed as discussed in the above-identified patent application. The information as so addressed is provided by the memory to readout register 75, where it is accumulated. Thus, one addressed group of information comprises data to be transmitted and the other addressed group comprises the instructions which control the disposition of the data. In normal operation, data in read in register 64 may only be gated into the area designated by the data address.

The information contained in readout register 75 is transmitted thereby to a decoder 85. The decoder separates the information into instructions and data. Decoder 85 transmits the data on cable 86 to register 20. The instructions, are transmitted on cables 87 and 88 to control circuitry 35 and interleave control 18. Control circuitry 35 comprises a plurality of logic decoding circuits which are operated by the signals from decoder 85 and by clock signals from clock 90 appearing on line 91. The logic circuits operate in a straightforward predetermined manner to accordingly provide signals on lines or sets of lines 52, 76, 77 and 92–102. These signals control the various operations of the arithmetic logic unit 44, read in register 64, readout register 75 and gating circuits 26, 27, 29, 32, 36–39, 55, 56, 60–62, 65, 66, 105 and 106.

Gates 105 and 106 connect the primary and secondary memory address registers 70, 71 to cables 43 and 49. Cable 43 carries data address and cable 49 instructions addresses. Gate circuits 105 and 106 therefore gate the combined addresses to registers 70 and 71.

Clock 90 supplies two separate trains of clock pulses, designated, respectively, the A-phase and B-phase. An A-phase pulse is supplied on line 120 followed by a B-phase pulse on line 121. The phases then repeat on a continuing basis. These signals are supplied to interleave control 18 which selectively supplies the A-phase on line 125 and the B-phase on line 126, or supplies both the A and the B phases on line 125. Line 125 transmits the pulses thereon to gate circuits 72 and 127 and line 126 transmits the pulses thereon to gate circuits 73 and 128.

Figure 3:
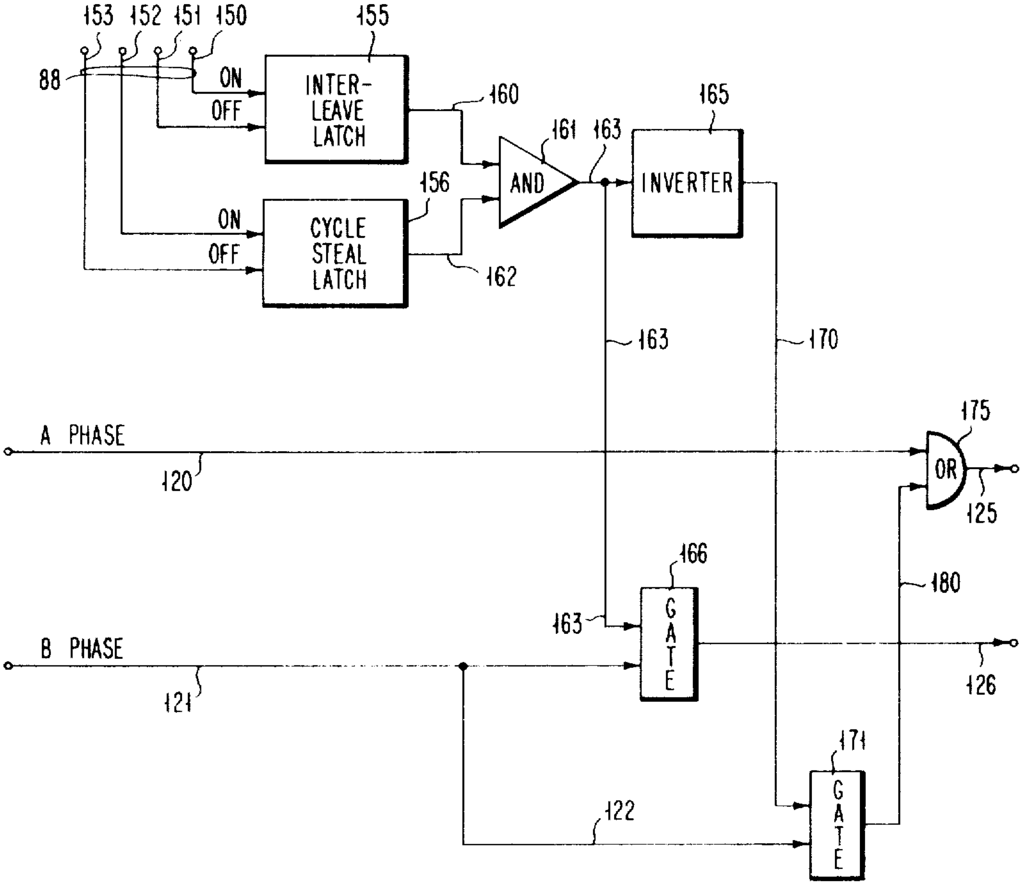
FIG. 3 is a diagrammatic representation of the interleave control circuit of FIG. 2.

Referring now to FIG. 3, the interleave control 18 of FIG. 2 is illustrated in detail. Illustrated the same as FIG. 2 are input wires 120 and 121 and output wires 125 and 126. Cable 88 of FIG. 3 comprises wires 150–153. These input wires are supplied to interleave latch 155 and the cycle steal latch 156. A signal appearing on line 150 turns on interleave latch 155, and a signal on line 151 turns the latch off. Similarly, a signal appearing on line 152 turns on cycle steal latch 156 and a signal on line 153 turns the latch off.

Operation of interleave latch 155 causes it to supply a continuing signal on line 160 to AND-circuit 161. Similarly, when operated, cycle steal latch 156 supplies a continuing signal on line 162 to the AND-circuit 161. If one or no input is supplied to the AND-circuit, and AND circuit supplies no signal on line 163 to inverter 165 and gate circuit 166. However, if both latch 155 and latch 156 supply signals to AND-circuit 161, the AND circuit supplies an output signal on line 163.

Inverter 165 operates to invert the output of AND-circuit 161. Thus, if no signal is supplied on line 163, inverter 165 will supply a signal on line 170 to gate circuit 171. Similarly, if AND-circuit 161 supplies an output signal, inverter 165 supplies no signal on line 170.

The gate circuits 166 and 171 are employed to control the distribution of the B-phase pulse train. No control over the A-phase pulse train is provided. The A-phase pulses are supplied on line 120 to OR-circuit 175 which transmits the signal on output line 125. B-phase pulses are supplied on line 121 to gate circuit 166 and gate circuit 171.

Should latch circuit 155 or latch circuit 156 or both be turned off, AND-circuit 161 does not supply a signal on line 163, and inverter 165 therefore supplies a signal on line 170. As a result, gate circuit 166 will block the B-phase pulses on line 121 from the output lines 126. The signal on line 170 operates gate circuit 171 to transmit the B-phase pulses on line 180 to OR-circuit 175. This circuit transmits the B-phase pulses to line 125. As a result, both the A- and B-phase pulse trains are combined on output 125.

If both latch 155 and latch 156 are on, AND-circuit 161 provides an output signal on lines 163. Inverter 165 responds by providing no signal on line 170, thereby causing gate circuit 171 to block the B-phase pulses from line 180. The signal on line 163 causes gate 166 to be operated to transmit the B-phase pulses to output lines 126.

Thus, when both latches 155 and 156 are operated, the A-phase signals are supplied on line 125 and the B-phase signals are supplied on line 126 interleaving the two pulse trains.

The operation of the apparatus of FIGS. 1 through 3 will now be described.

Assuming that no unexecuted instructions are presently in the control system, the system is in a "wait" state. Thus, a set of instruction signals from supervisor 80 of FIG. 2 have been supplied to readout register 75, decoded by decoder 85 and supplied to controls 35 and interleave control 18. The control circuitry 35 responds by transmitting signals to operate gate circuits 26, 38, 42, 47 and one of the gate circuits 66. In addition, the decoder supplies a signal from supervisor 80 to line 150 of FIG. 3 to thereby turn on interleave latch 155, the primary program 81 having previously supplied a signal on line 152 to thereby turn on cycle-steal latch 156. These circuits thereby supply signals on lines 160 and 162 to AND-circuit 161. The AND circuit responds by supplying a signal on line 163 to gate circuit 166. In this manner, gate 166 is operated to thereby transmit B-phase signals from line 21 to line 126. At the same time, inverter 165 inverts the signal from AND-circuit 161 and supplies no signal to gate circuit 171. Hence, the B-phase signals are blocked from OR-circuit 175, so that only the A-phase pulses are transmitted to output line 125. The A-phase pulses on line 125 therefore appear alternately with the B-phase pulses on line 126. The outputs on lines 125 and 126 thereby alternately operate gate circuits 72 and 73 of FIG. 2 to continually address primary program 81 and supervisor 80, respectively. The supervisor 80 may be addressed either by primary memory address register 70 or secondary address register 71. Its function is one of supervising between the two programs and the operation of the overall machine.

The system is enable by supervisor 80 during each B-phase of the clock 90 to receive an instruction from the channel on cable 25 and transmit that instruction to ALU 44 for comparison with preset signals in one of the registers 23 gated by the corresponding gate circuit 66.

At this time, assume that the channel of the central processing unit transmits a "start I/O" command together with an address which identifies the control system 10 and the storage device 14 desired. The channel interface 15 indicates to the channel that the control unit has been selected and transmits the device address and the "start I/O" code word over cable 25. As discussed above, this data is transmitted to register 21 and by A bus 41 via gate 38 to ALU 44.

The character from cable 25 is compared by ALU 44 to the corresponding character in the general purpose register 23 under the control of supervisor 80. The comparison by the ALU 44 produces thereby signals indicating a match on lines 50 and 51 to gate circuits 127 and 128. These signals are transmitted by gate circuit 128, which was operated by the B-phase signal on line 125, to secondary memory address register 71 to thereby modify the address therein for transmission by gate 73 the next time the gate is operated. The next A-phase produces no net effect, and on the next B-phase, the new address is gated by gate circuit 73 to memory 16. The intervening A-phase has no effect on the system since the primary memory address again addresses the "wait" state of the primary program 81.

The subsequent addressing during the B-phase of memory 16 causes another code containing instructions having a secondary memory address and a data address, from supervisor 80 to be read out to readout register 75 and decoded by decoder 85. The decoder supplies the instructions to control circuitry 35 on cable 87 and transmits that address on cable 86. The control circuitry responds by operating gating circuits 61, 47 and 106 to thereby supply the secondary memory address to secondary memory address register 71 and by operating gating circuits 60, 42 and 106 to supply the data address to primary address register 71. On the following B-phase, gate circuit 73 supplies the new addresses to memory 16, thereby causing secondary program 82 to supply control signals to readout register 75 and the data to cable 86. The control signals are decoded by decoder 85 and supplied to control circuitry 35 via bus 87. The control circuitry thereby operates gate circuits 38 and 61, circuits 42 and 47, and ALU 44 so that the address of the desired storage device is transmitted from register 21 to the ALU and the data from cable 86, via register 20, to the ALU to detect whether the desired device is available or unavailable. In the data, each bit position corresponds to a storage device and a "1" indicates an instruction is outstanding for that device, and a "O" indicates the device is available. The address from register 21 causes the ALU 44 to check the desired bit position and the result appears on lines 50 and 51. As before, this output modifies the secondary memory instruction address register contents. Upon the check indicating the device was unavailable, the secondary step selected causes a signal indicating the device was "busy" to be transmitted by decoder 85 on cable 86, via register 20, gate 61, circuit 47, ALU 44, gate 36, register 21, and gate 27 to the channel interface 15.

However, if the checking in ALU 44 indicated that the device was available, a modified secondary memory address in register 71 as gated by gate circuit 73 would select the step in secondary program 82. This program step would cause an "available" code signal to be transmitted via the same route to the channel interface 15. In the next B-phase, the program steps to the next point which transmits an end-of-record character to a general purpose register 23. The next program step establishes the control signals for the gating of data by gate circuits 26, 38, 42, ALU 44, gate circuit 55, register 20 and gate circuit 62 to the read-in register 64. The address of the position in data area 83 of memory 16 for an instruction set relating to the selected device is set in secondary memory address register 71. At this time, the channel may transmit an instruction set and accompanying data, if any, to the channel interface. Using the described routes, this data is continually set into the data area 83 of memory 16 until all of the instruction set and data has been properly inserted into that area set aside for the designated storage device, all being accomplished during the B phases of clock 90, the addresses being continually incremented or branched.

A special end-of-record code is transmitted by the channel at the conclusion of the information. While transmitting this signal to the memory 16, the ALU decodes same by comparison to the output of the general purpose register 23 and supplies signals indicating the comparison on lines 50 and 51. These signals select the next step which causes the transmission, via decoder 85, cable 86, register 20, gate 61, A bus 41, gate 47, ALU 44, D bus 40, gate circuit 36, register 21, gate circuit 27 and cable 28, to the channel interface 15 of FIG. 1, of a code word which indicates that the information has been properly received and stored. In the next selected step, the secondary program 82 causes a bit to be inserted in the bit position of the word from register 23 that designates that the selected storage device is busy, and returns the word to memory 16.

As its next step, secondary program 82 transfers an address through the normal route, but causes control circuitry 35 to operate gate 105, thereby causing that address to be inserted in primary memory address register 70. Thus, on the following A-phase, the new primary memory address is gated by gate circuit 72 to the memory 16. This instruction supplies both a code word and instructions to readout register 75 which are decoded by decoder 85. The code word is supplied on cable 86 and the instructions on cable 87. The controls operate in response thereto to operate gate 60 and circuit 42 to supply the code word to the ALU 44. The ALU transmits the code word via a gate 56 to a selected register 23. The ALU also supplies signals on lines 50 and 51 to indicate no operation was performed. These signals are gated to primary memory address register 70 and modify that address On the B-phase, secondary memory address register 71 supplies signals which are gated by gate circuit 73 to thereby select the next step in the secondary program 82. This step supplies the address of the original "wait" state in supervisor 80 to the secondary memory address register 71. Thus, on the next following B-phase, the supervisor 80 will have control over the secondary program and the gates 26 and 38 will be operated as at the beginning of operation so as to be available for the receipt of any further request from a channel via the channel interface 15.

On the next A-phase, the incremented primary program supplies additional data to the primary memory address register 70. This data is employed on the next following A-phase to select from data area 83 a specified portion of the instruction set for the selected device, causing the instruction to be read out of memory 16 and transmitted on cable 86, register 20, gate circuit 60, circuit 42 to the ALU 44. The instruction is further transmitted via gate 37, register 22 and gate 29 to device interface 17. In ALU 44 the same instruction is compared to the code word stored in the selected register 23 as gated out by the appropriate gate circuit 66 and circuit 47 to ALU 44. A positive comparison indicates that a seek instruction is included as the first instruction in the instruction set. This positive comparison is signaled by the ALU on lines 50 and 51 to the primary memory address register 70.

These signals cause the primary memory address register to transmit on the next A-phase the address of another step in primary program 81. This step effects a readout in the next A-phase of the seek address from the selected instruction set contained in data area 83. The seek address is transmitted on cable 86 to register 20, gate circuit 61, gate circuitry 47, ALU 44, gate 37, register 22, and gate circuit 29 to the device interface 17. The seek instruction and address are then transmitted by device interface 17 to the selected data storage device 14. The device operates accordingly to seek the selected track.

Thus, the seek has been initiated. The last step of the primary program causes an address to be entered in register 70 which, when operated in the next A-phase, enters the original primary program "wait" state.

As a result of these operations, both the supervisor 80 and primary program 81 are in the same state as before any request was received from the channel of the CPU.

The "wait" state of primary program 81 continually operates on each A-phase. The step operates gates 32 and 39, gate circuitry 42, and ALU 44 to detect whether a signal has been supplied to register 22 from the device interface 17. When the access mechanism of the selected data storage device 14 has reached the desired cylinder, the seek circuitry thereof immediately sets a voltage level on a line to the device interface 17. This voltage level indicates that at least one device has a seek complete. In addition, the seek circuitry transmits the address of the cylinder, including the device address, to the device interface. The device interface circuitry responds by setting a bit in the bit position of a register therein corresponding to that device. This bit designates which device queued the seek complete. The device interface then also transmits a code word to register 22 indicating that a seek is complete.

As discussed above, the CPU 13 may have transmitted further requests to the channel interface 15 while the primary program 81 was initiating the seek instruction to the selected device. The secondary program likewise may be activated by requests from the CPU 13 while the primary program is in the "wait" state. Thus, if one or a number of instructions sets have been received from the CPU, each including a seek function, the secondary program each time would transfer control to the primary program 81 which would thereby initiate the seek instruction at the selected devices, assuming that no two were directed to the same device. The accomplishment of the seek instruction may involve physically moving a set of heads from one set of tracks to another set of tracks. Such physical movement must be accomplished electromechanically and, hence, takes a relatively long time as compared to the strictly electronic speeds of the operation of the storage control. Thus, the initiation of a number of seek instructions before the completion of one of them is not uncommon.

If the primary program 81 has been kept busy by other instructions, such as search, read, or write, a number of seeks may stand completed at any one time. Thus, the voltage levels are effectively ORed together in the device interface 17. A detailed description of the device interface 17 is contained in the above-identified copending patent application. Also in the device interface, the bit position in the register for each device having a seek complete would be filled. As discussed above, the testing of the device interface for a seek complete is accomplished by the primary program upon returning to the "-wait" state. The voltage level at the device interface is converted to a code word and supplied thereby to cable 31. When in the "wait" state, the primary program operates gate 32 so that this code word is supplied to register 22. The register supplies the code word via gate 39 and gating circuitry 42 to the ALU 44. The ALU detects this bit by supplying a signal on lines 50 and 51, via gate 127, to primary memory address register 70. This signal modifies the contents of primary memory address register 70 and the new address is gated by gate circuit 72 to memory 16 at the next A-phase. The next instruction supplies a signal to device interface 17 to gate out the contents of the queue register therein onto cable 31. Other control signals resulting from that instruction operate gate circuits 32 and 39, gating circuit 42 and ALU 44 so that the contents of the register are transmitted to the ALU and the ALU determines the bit position of the highest order position having a "1." The designation of that bit position is transmitted by the ALU on D bus 40, via a gate circuit 56, to one of the general purpose registers 23.

The test for seek complete therefore has been completed.

The next selected step in the primary program 81 operates the gate 66 at the output of the register storing the designation of the selected data storage device having completed the seek. The control signals also operate gating circuitry 47, ALU 44, gate circuits 55 and 62, and read-in register 64, thereby supplying its designation to the primary program 81. This indicates that the primary program is dedicated to the selected data storage device until the search has been accomplished and the following read or write instruction completed, or until the search operation has been unsuccessfully completed.

Figure 4:
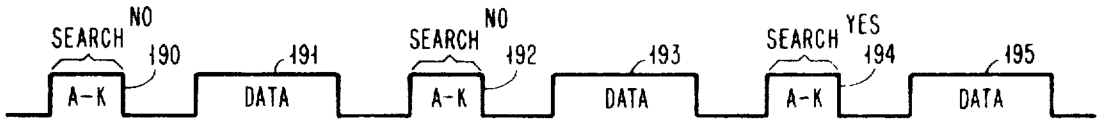
FIG. 4 is a diagrammatic representation of the layout of data records on a single track.

Referring now to FIG. 4, an example of the layout of data records on a single track is illustrated. A block 190 precedes the data 191 in each record. The block 190 may comprise the address of the data, or a key or both. An address comprises the numerical ordered position of the data in a string of data, and a key comprises a designation related to the data in some way other than the position in storage of the data. An example of a key is a social security number. The block 190 preceding the data may thus in practice comprise a series of blocks or a single block and be an address, a key, or both. As discussed with respect to the above-identified copending application, the data storage device detects and decodes the information read by the selected transducer and supplies this information serially to the device interface 17. The device interface converts the information into parallel form and supplies the information on cable 31.

The beginning of each address-key block is indicated by the presence of a special code character. The primary program operates to transmit the code word designating the beginning of the address-key block therefrom in FIG. 2 via readout register 75, decoder 85, register 20, gate circuit 61, B bus 48, gating circuitry 47, ALU 44, D bus 40, and one of the gate circuits 56 to a selected general purpose register 23. On the next A-phase, the primary program operates to gate the output of the selected general purpose register 23 via the corresponding gate circuitry 66 and gating circuitry 47 to ALU 44. At the same time, gate circuits 32 and 39 and gating circuitry 42 are operated to transmit information read by the selected transducer from the data storage device as decoded and converted into parallel information by device interface 17. This information is transmitted to the ALU 44 for comparison with the character that has been stored in the general purpose register. If the comparison indicates that the information and the character are not the same, ALU so signals the primary memory address register 70, via lines 50 and 51 and gate circuit 127. The address in the register is therefore not changed thereby and the same instruction is addressed in memory 16 by gate circuit 72 on the subsequent A-phase. The storage control thus repeatedly compares the information as read from the data storage device with the stored special character in order to detect the beginning of an address-key block. So long as the beginning of an address-key block is not detected, the secondary program 82 is available for communication with a channel 11, 12 of the central processing unit 13.

When the beginning of an address-key block is encountered, ALU 44 indicates the positive comparison by means of signals on lines 50 and 51, via gate 127, to primary memory address register 70. The alternation to the address therein, when subsequently gated to the memory 16 during the next A-phase, thereby sequences to the next step of primary program 81. This step results in the supplying of information on cable 86, control signals on cable 87, and a signal on cable 88 to interleave control 18.

In FIG. 3, the signal on cable 88 appears at input line 153 to cycle steal latch 156. This signal turns off the cycle steal latch terminating the signal on line 162. This termination blocks AND-circuit 161 and thereby prevents the appearance on output line 163. As the result, gate circuit 166 is turned off and blocks the B-phase signals appearing on line 121 from being gated to output line 126. In this manner, no B-phase signals will be supplied to gate circuit 73 or 128 of FIG. 2.

The termination of the signal on line 163 of FIG. 3 also causes inverter 165 to thereby supply a signal on line 170. This signal operates gate circuit 171 to thereby gate the B-phase signals from line 121 appearing at input 122 onto line 180. The B-phase signals are then gated by OR-circuit 175 onto output line 125. As the result, both the A-phase and B-phase signals are supplied to the primary memory address gating circuits 72 and 127.

In addition to transmitting the control signal to interleave control 18, the primary program 81 supplies the designation of the selected data storage device 14 stored therein to register 20 of FIG. 2. The instruction control signals from primary program 81 are decoded by decoder 85 and supplied to control circuitry 35 which causes the device designation to be transmitted by gate circuit 61, gating circuitry 47, ALU 44, and one of the gate circuits 56 to a selected general purpose register 23. At the next phase of the clock, the primary program is incremented to the next step which comprises the transmission of a memory addressing word, via register 20, gate circuit 60 and gating circuitry 42, to the ALU 44. This word is combined in the ALU with the designation of the desired data storage device as gated by the appropriate gating circuit 66 and gating circuit 47 from its general purpose register 23. The resultant output is supplied on cable 40 gated by a gate circuit 56 to another of the general purpose registers 23. The information so stored in the general purpose register comprises the address in memory 16 of the search argument for the desired key. Hence, on the next cycle of the clock, the primary program instructs that this address be supplied by the appropriate gate circuit 66, gating circuitry 47, and gate circuit 105 to the data portion of the primary memory address register 70.

At this time, the data storage device 14 begins to transmit the address-key information contained in block 190 of FIG. 3. The primary program 81 of FIG. 2 accordingly operates gate circuits 32, 39 and gating circuitry 42 to supply this information to the ALU 44. The primary program 81 also operates to transmit the search argument contained in data area 83, via readout register 75, decoder 85, register 20, gate circuit 61, B bus 48 and gating circuitry 47 to the ALU 44. The ALU compares the search argument with the data read from block 190, indicating on lines 50 and 51 whether they are equal. After each positive comparison, the next step of the primary program increments the data address by one parallel unit of data and then cycles back to the comparison step. Thus, the search argument is sequenced through to be compared on a word-by-word basis with the address-key block 190.

As soon as the positive comparison is not made, no further searching of that block is required. This is because if all of the characters in the block 190 agree with the search argument except for one character, the key is not the one desired. Therefore, there is no need to compare further.

The noncomparison is signalled by the ALU on lines 50 and 51 to the primary memory address register 70. This causes the primary program to go to another step which includes the supplying of a signal on line 152 of cable 88 to cycle steal latch 156 of FIG. 3. This signal turns the latch on and supplies an output on line 162 to AND-circuit 161. The AND circuit is therefore capable of being operated by interleave latch 155, should that latch be turned on by a signal from supervisor 80. Such an operation would operate the interleave control 18 to separately supply the A-phase and B-phase signals on lines 125 and 126, respectively. In addition, the step of the primary program causes the address of an earlier step to be transferred to primary memory address register 70. This earlier step comprises the insertion of the special character representing the beginning of the address-key block into a general purpose register 23. As before, the primary program then causes the ALU to compare the incoming data with the special character to detect the beginning of the next address-key block 192 of FIG. 4. During the entire period from the noncomparison during the search of block 190 until block 192 is detected, the secondary program is thereby available for communication with a channel of the CPU.

In the normal case, only the address or the key or a portion of the key would actually be searched. To accomplish this, the search argument would include a number of special characters which, when transmitted to the ALU 44 for comparison, would indicate to the ALU that no actual comparison was to be made regardless of the nature of the incoming data from the selected data storage device. This character is called a "-don't care" character.

When the character indicating the beginning of the address-key block 192 is detected, the storage control operates as before to supply a signal on line 153 to turn off cycle steal latch 156 of FIG. 3 and prevent the separation of A-phase and B-phase signals of the clock so that all clock signals are supplied on line 125. The comparison of the search argument with the information from address-key block 192 is performed as before. Once again, the search may indicate no comparison and the search aborted. In that event, the primary program 81 again supplies a signal on line 152 of cable 88 to thereby operate the cycle steal latch and supply an enabling input to AND-circuit 161. In this manner, the interleave control 118 may be operated by interleave latch 155 to supply clock signals on line 126 and allow the secondary program 82 to communicate with a channel of the CPU.

Upon the detection of the beginning of address-key block 194, the primary program again supplies a signal on line 153 of cable 88 to thereby turn off the cycle steal latch 156. The disables the AND-circuit 161 so that the B-phase clock signals are blocked from line 126 and supplied instead to line 125. The comparison of information from address-key block 194 with the search argument is then conducted as before. In this instance, it is assumed that the desired information has been located. Therefore, the ALU 44 continues to provide positive comparison indications on lines 50 and 51 until the search argument and the block 194 are exhausted. The continued indication by the ALU of the positive comparison at this time is the signal that the following block of data 195 is that data which is desired.

The instruction address in the primary memory address register 70 is modified thereby to address the next step of the primary program 81. This step causes the next instruction from the instruction set for the selected device to be read out of memory 16 of FIG. 2. This instruction may be either to read or write, and is transmitted via register 75, decoder 85, cable 86, register 20, gate circuit 40, A bus 41, gating circuitry 42, ALU 44, D bus 40, and a selected gate 56 to a selected general purpose register 23. The primary program 81 then causes a special character to be transmitted therefrom via readout register 75, decoder 85, cable 86, register 20, gate circuit 60, A bus 41, and gating circuitry 42 to ALU 44. At the same time, the instruction from the instruction set for the selected storage device is transmitted by the appropriate gate circuit 66 from the selected general purpose register 23 to gating circuitry 47 and the ALU 44. The special character and the instruction are compared in the ALU and the output therefrom on lines 50 and 51 indicates whether the instruction was to read or write. The signals are then set via circuit 127 to operate the primary memory address register 70, thereby selecting the next instruction.

Assuming that the instruction was to write data, the next instruction in the primary program causes the write data command to be transmitted from the selected general purpose register 23, via the appropriate gate 66, B bus 45, gating circuitry 48, ALU 44, D bus 40, gate 37, register 22, gate 29, and cable 30, to the device interface 17. This instruction is transmitted by the device interface to the selected device which thereby connects the device interface, through data write circuitry, to the previously selected read-write transducer. The next instruction causes the special "end of record" character to be inserted in a selected general purpose register 23 for continuous comparison to the data being written as discussed above with respect to the reading in of data from the CPU.

The following instruction in the primary program causes the data portion of the primary memory address to address the first byte of the data which had been written into memory by the channel of the CPU and is to be written into storage at the selected data storage device. The next instruction from the primary program 81 is gated out together with the initially addressed portion of the data to readout register 75, the instructions being separated by decoder 85 to operate control circuitry 35 and cause the data that is supplied on cable 86 to be transmitted to the device interface 17 via register 20, gate 60, A bus 41, gating circuitry 42, ALU 44, D bus 40, gate 37 register 22, gate 29, and cable 30. The device interface converts the data from parallel to serial form and transmits the serial data to the selected data storage device where it is written onto the track. The same instruction is repeated, with the data address continually incremented until the last character of the data is transmitted. This last character comprises the "end of record" character, which is recognized by the ALU by comparison to the end-of-record character as gated to the ALU by a gate circuit 66 from the selected general purpose register 23, as discussed above.

The ALU 44 indicates the comparison by supplying appropriate signals on lines 50 and 51, via gate circuit 127, to primary memory address register 70. This comparison causes a shift to another instruction address. At the new address, the primary program causes the control word indicating whether the data storage devices are busy to be read out to the ALU 44. The ALU changes the bit representing the device having just complete the write instruction from a "1" to a "O." The ALU then gates the change word to register 20 where it is read back into memory 16 on the following cycle. The "O" thus indicates that the device is no longer busy. In the next step, the primary program causes the erasure in data area 83 of the instruction set relating to that device. Thus, should a "test" instruction be accepted from the CPU the absence of instructions in the instruction set would indicate that there are no outstanding instructions for the selected device.

On the next cycle, the next step of primary program 81 is addressed which causes a "1" bit to be inserted in a "status"queue in the data area 83 of memory 16, in the position in the queue designating the selected device. The instruction also causes control circuitry 35 to supply a voltage output on line 94, via the channel interface 15, to channels 11 and 12. This voltage signal is called the "request interrupt" signal and indicates that the storage control 10 desires to present status to the CPU 13. The primary program then addresses an "establish polling" instruction in supervisor 80, using the primary memory address register 70, and also transmits a control signal on line 152 of cable 88. The control signal thereby operates cycle steal latch 156 which supplies an output on line 162 to thereby enable AND-circuit 161.

The "establish polling" instruction of supervisor 80 supplies an output signal on line 150 of cable 88 to thereby operate interleave latch 155. This results in the application of a signal on line 160 to AND-circuit 161, causing the interleave control 18 to supply the A-phase signals on output line 125 and a B-phase signal on output line 126. The instruction of supervisor 80 then supplies the address of its next instruction to secondary memory address register 71 and supplies the address of the "-wait" state of the primary program to primary memory address register 70. The next supervisor instruction is gated by gate circuit 73 upon the occurrence of the next B-phase. In this next step, the secondary program 82 supplies a special "-present status" code word via register 20, gate 60, A bus 41, gating circuitry 42, ALU 44, D bus 40 and a selected gate 56 to the general purpose register 23. The following step is called "await polling" and on each B-phase operates appropriate gate circuits to transmit the "present status" code word to ALU 44 and directs the ALU 44 to compare the "present status" word with any input from channel interface 15. Any response from the CPU will be discussed hereinafter.

Assuming now that the instruction for the device 14 having been selected from the queue was to read data at the successful completion of the search instruction, the primary program 81 checks the instruction set for that device exactly as before to determine the nature of the next instruction. As before, this checking comprises the comparison by ALU 44 of the instruction command with the special character. The ALU thus indicates on lines 50 and 51 that the command is to read data. Additionally, as before, the read instruction is transmitted from the ALU to the device interface, via D bus 40 and register 22. The device interface responds by maintaining the prior connection with the selected head and the selected data storage device, the connection having been established for the search operation. The primary program 81 additionally maintains the blocking of clock signals on line 121 of the interleave control 118 from output line 126, so that both the A and B phases are transmitted to the gate circuit 72. Thus, no communication is allowed between a channel and the storage control.

The primary program 81 then, as before, supplies the special "end of record" character to the selected general purpose register 23 for subsequent continuous comparison to the data from the data storage device. The program then supplies the address of the beginning of the area allocated to the selected data storage device within data area 83 of memory 16. This address is supplied to primary memory address register 70.

Then the serial string of information from the selected data storage device is deserialized by device interface 17, as discussed in the above-identified copending application, and the resultant parallel data supplied over cable 31 and gate circuit 32 to register 22. The data is further transmitted in accordance with control signals from circuitry 35, via gate 39, A bus 41, gating circuitry 42, ALU 44, D bus 40, gate circuit 55, register 20, gate circuit 62 and read-in register 64 to the selected address. As additional data is received, the address is continually incremented until all the data has been inserted in memory 16.

The last portion of the data comprises the end of record character which is detected by ALU 44, as discussed above. The ALU supplies the signals indicating the comparison on lines 50 and 51, via gate circuit 127, to primary memory address register 70. No change in the "busy" indication is made, a difference from the "write" instruction. Rather, on the next cycle, the next step of primary program 81 is addressed which causes a "1" bit to be inserted in a "status" queue in the data area 83 of memory 16, in the position in the queue designating the selected device. The instruction also causes control circuitry 35 to supply a voltage output on line 94, via the channel interface 15, to channels 11 and 12. This voltage signal is called the "request interrupt" signal and indicates that the storage control 10 desires to present status to the CPU 13. The primary program then addresses an "establish polling" instruction in supervisor 80, using the primary memory address register 70, and also transmits a control signal on line 152 of cable 88. The control signal thereby operates cycle steal latch 156 of FIG. 3 which supplies an output on line 162 to thereby enable AND-circuit 161.

The "establish polling" instruction of supervisor 80 supplies an output signal on line 150 of cable 88 to thereby operate interleave latch 155. This results in the application of a signal on line 160 to AND-circuit 161, causing the interleave control 18 to supply the A-phase signals on output lines 125 and a B-phase signals on output line 126. The instruction of supervisor 80 then supplies the address of its next instruction to secondary memory address memory register 71 and supplies the address of the "wait" state of the primary program to primary memory address register 70. The next supervisor instruction is gated by gate circuit 73 upon the occurrence of the next B-phase. This secondary program 82 supplies a special "present status" code word via register 20, gate 60, A bus 41, gating circuitry 42, ALU 44, D bus 40 and a selected gate 56 to the general purpose register 23. The following step is called "await polling" and on each B-phase operates appropriate gate circuits to transmit the "present status" code word to ALU 44 and directs the ALU 44 to compare the "present status" code word with any input from channel interface 15.

The CPU "accepts" the request interrupt on line 94 by transmitting a "present status" code word via channel 11 or 12 to channel interface 15. The channel interface transmits the code word on cable 31. During a B-phase, the code word is transmitted by gate circuit 32, register 22, gate 39, and gating circuitry 42, to the ALU 44. The code word is then compared to the output of the selected general purpose register 23 by the ALU and the result of that comparison is supplied on lines 50 and 51.

A comparison causes the secondary memory address register to select an instruction from secondary program 82 which causes the read out of the "status" queue from memory 16. The ALU 44 converts the status word to the designation of the highest ordered data storage device 14 having its status posted as a "1" bit therein. This designation is supplied by the ALU on D bus 40, gate 36, the register 23 and indicates a positive comparison on lines 50 and 51. This increments supervisor 80 which addresses the secondary program 82. The secondary program operates to place the address of the first byte of data area 83 for the designated device in the address portion of secondary memory address register 71. Accordingly, the data is read out, via register 75, decoder 85, cable 86, register 20, gate 61, B bus 48, gating circuitry 47, ALU 44, D bus 40, gate 36, register 21, gate 27, and cable 28 to channel interface 15. The channel interface accordingly transmits the data to a channel of the CPU. The data transfer continues in a manner nearly identical to that of the write operation, discussed above, except that it is transferred from data area 83 of memory 16 to register 21 and cable 28, rather than to register 22 and cable 30 for the write operation. Transfer of data continues until end of record character is indicated, at which time, the device is indicated as being available and the instruction set erased. Control is then transferred to supervisor 80, as discussed above.

One further operation of storage control 10 not yet described is the "accept test" operation. This function is described only briefly and comprises the transmission by the CPU to channel interface 15 of a "test" command together with a control unit designation and a device designation. This command is transmitted by the channel interface 15 to the ALU 44 where supervisor 80 detects the nature of the command and transfers control to register 21, gate 27, and cable 28 to channel interface 15, whereupon it is transmitted to the channels.

In the next instruction, the secondary program causes the status for that device to be erased from the status queue and transfers control to the "wait" state of supervisor 80.

The CPU remembers the command that it has given the device. Thus, a "1" indicates that the instruction has been successfully completed and, if the instruction was to "read," that the data is available in memory 16. A "O" indicates that something went wrong and the instruction was not successfully completed. If the status indicates that a read operation has been successfully completed, the CPU must later supply a present data instruction for that device before sending another set of instructions thereto. In the meantime, the device is indicated as "busy."

After completion of presenting the status to the channel, the secondary program 82 checks whether the device is "busy," thereby indicating that data is awaiting transfer to the CPU. If so, the secondary program switches to supervisor 80 which supplies a special "present data" character to a selected general purpose register 23.

Subsequently, the CPU may transmit the "present data" command to channel interface 15. This command is transmitted, via cable 25, to gate 26, register 21, gate 38, A bus 41, and gating circuitry 42 to ALU 44. The ALU compares the command to the stored code word from secondary program 82. Should interleave control 18 be operated so as to supply the B-phase signals on line 126, the secondary program causes the instruction set in data area 83 for the designated device to be read out, via register 21, on cable 28, to the channel interface 15, and then to the CPU.

The invention has been shown as implemented with a memory 16 which is employed for data storage and for control storage. Newer memories have been reduced in cost per bit sufficiently to make this approach the most economical. However, the invention may also be implemented with a read only control store (ROCS) hardware unit, such as described in the above-identified patent application, in the same manner as described herein. The only differences would be the supplying of data addresses to the memory addressing means and the instruction addresses from the primary and secondary address registers to a ROCS address control, and the lack of need to employ means to separate data from instruction information since separate storage means are employed.

While the invention has been described with reference to a preferred embodiment thereof, it will be understood by those skilled in the art that changes in form and details may be made therein without departing from the spirit and scope of the invention.

What is claimed is:

1. Apparatus for controlling the operation of a plurality of data storage devices under the command of instructions from a central processing system to transfer data therebetween comprising data storage control apparatus connected to said control central processing system and adapted to communicate therewith, and connected to said plurality of data storage devices and adapted to communicate with and control the operation of any one of said data storage devices at any one time, with the improvement thereto comprising:

memory means for storing information;

primary memory address register means for storing primary memory address signals;

secondary memory address register means for storing secondary memory address signals;

primary address control means for controlling the timing of the transmission of said primary memory address signals from said primary memory address register means;

secondary address control means for controlling the timing of the transmission of said secondary memory address signals from said secondary memory address register means;

memory addressing means responsive to address signals transmitted from said memory address register means to address portions of said memory means;

memory output means for reading information from said address portions of said memory means;

decoding and control means for supplying various control signals in response to certain of said information at said memory output means;

operation means responsive to certain of said control signals for selectively routing the transmission of information in said apparatus, and to and from said central processing system and said data storage devices;

logic means responsive to certain of said control signals and certain of said information transmitted thereto by said operation means to supply address signals to said memory address register means;

a source of clock signals; and interleave control means coupled to said primary and said secondary address control means and responsive to said source of clock signals and to certain of said control signals for selectively switching between two states of output, one state comprising supplying two separate trains of alternately occuring clock signals to, respectively, said primary and said secondary address control means, and the other state comprising supplying a single, combined train of clock signals to said primary address control means, each said supplied clock signal thereby operating said address control means to which it is supplied.

2. The apparatus of claim 1 wherein said decoding and control means is additionally responsive to said source of clock signals to limit the duration of said control signals, thereby separating the operation of said operation means into distinct cycles, each cycle of operation being in accordance with said instruction information as addressed under the control of a single operation of said primary or said secondary address control means as determined by said interleave control means.

3. The apparatus of claim 2 wherein said information stored in said memory means includes instruction information for operating said decoding and control means, said instruction information including primary instruction information addressable from said primary memory address register means, and secondary instruction information addressable from said secondary memory address register means, whereby control signals are supplied by said decoding and control means in accordance with said primary or said secondary instruction information at each said cycle of operation as determined by said interleave control means.

4. The apparatus of claim 3 wherein said operation means includes means for communication with said data storage devices and means for communication with said central processing system, said decoding and control means supplying control signals to operate said means for communication with said data storage devices in response to certain of said supplied primary instruction information and supplying control signals to operate said means for communication with said central processing unit in response to certain of said supplied secondary instruction information.

5. The apparatus of claim 4 wherein said interleave control means additionally includes latch means responsive to one of said certain control signals to assume a first state, enabling said interleave control means to supply said two separate trains of alternately occurring clock signals, and responsive to another of said certain control signals to assume a second state, operating said interleave control means to supply said single, combined train of clock signals.

6. The apparatus of claim 5 wherein said decoding and control means comprise means responsive to certain of said primary instruction information for supplying said one and said another of said certain control signals at said memory output means.

7. The apparatus of claim 6 wherein said information stored in said memory means additionally includes supervisory instruction information addressable from either said primary or said secondary address memory register means.

8. The apparatus of claim 7 wherein interleave control means additionally includes:

second latch means responsive to a third of said certain control signals to assume a first state, providing an output signal, and responsive to a fourth of said certain control signals to assume a second state, terminating said output signal; and coincidence means responsive to the coincidence of the output of said first latch means when in said first state and said output signal from said second latch means when in said first state to operate said interleave control means to supply said two separate trains of alternately occurring clock signals, and responsive to the absence of said coincidence to operate said interleave control means to supply said single, combined train of clock signals.

9. The apparatus of claim 8 where said decoding and control means include means responsive to certain of said supervisory instruction information for supplying said third and said fourth of said certain control signals at said memory output means.

10. The apparatus of claim 9 wherein:

said source of said clock signals supplies said two separate trains of alternately occurring clock signals to said interleave control means; and said interleave control means includes means to continually supply one of said trains of clock signals to said primary address control means, and includes gating means operated by said coincidence means upon said coincidence of outputs to transmit the other of said trains of clock signals to said secondary address control means, and operated upon said absence of said coincidence to transmit the other of said trains of clock signals to said primary address control means, thereby combining said two trains of clock signals.

11. The apparatus of claim 9 wherein said information stored in said memory means additionally includes data information addressable from either said primary or said secondary address register means.

12. The apparatus of claim 11 further including gating means coupled to said primary and said secondary address register means for gating address signals for addressing said data information, said address signals being for simultaneous storage in said primary and said secondary memory address means, said instruction information in said primary and said secondary address control means being capable of supplying all said address signals from said primary and said secondary address register means to said memory addressing means, and said decoding and control means additionally including means for separating said addressed data information from said instruction information, whereby said data may be selectively routed by said operation means.

* * * * *